Feb. 7, 1939.  F. R. BUTHERUS  2,146,499
ELECTRIC CLOCK MOVEMENT
Filed Aug. 14, 1936  2 Sheets-Sheet 1

Inventor
Frederick Roy Butherus
By Brown, Jackson, Boettcher & Dienner
Attys

Feb. 7, 1939.  F. R. BUTHERUS  2,146,499
ELECTRIC CLOCK MOVEMENT
Filed Aug. 14, 1936  2 Sheets—Sheet 2

Inventor
Frederick Roy Butherus
By Brown, Jackson, Boettcher & Dienner
Att'ys

Patented Feb. 7, 1939

2,146,499

UNITED STATES PATENT OFFICE 2,146,499

ELECTRIC CLOCK MOVEMENT

Frederick Roy Butherus, Enfield, England, assignor to Sangamo Electric Company, Springfield, Ill.

Application August 14, 1936, Serial No. 96,011
In Great Britain January 16, 1936

1 Claim. (Cl. 58—26)

The present invention relates to improvements in electric clock movements and is more particularly concerned with a clock movement in which the time shaft is normally driven by a synchronous electric motor while when the motor fails the time shaft is driven by auxiliary spring driving means under the control of an escapement device.

An object of the invention is to provide means whereby when the synchronous motor fails the spring driving means and the escapement device are brought into operation with the minimum delay.

A feature of the invention relates to the use of a mechanical locking device controlled by the field of the motor and arranged to stop the escapement device in a position of maximum potential energy so that when the motor fails the escapement is rapidly released and takes over the control of the time shaft.

A further feature of the invention relates to the use of a differential device between the motor and the time shaft so arranged that when the motor drives the time shaft, the escapement and one of the sun wheels are locked while when the motor fails the sun wheel is released, the other sun wheel is locked and the time shaft is driven by the spring under the control of the escapement device, the spring being wound by the synchronous motor.

The invention will be better understood from the following description of two embodiments taken in conjunction with the accompanying drawings in which.

Figure 1:
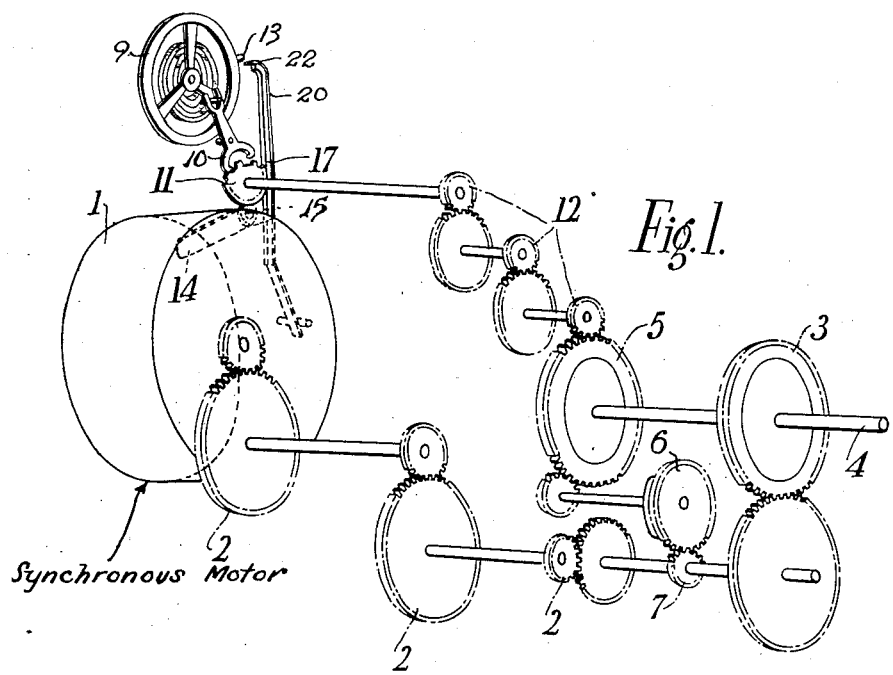
Fig. 1 shows a perspective view of the clock movement.

Referring more particularly to Fig. 1, a self-starting synchronous electric motor 1 drives through gearing 2, one element of a ball clutch 3, the other element of which is fixed to the time shaft 4. A second ball clutch 5 is also mounted on the time shaft 4, and the first element is driven by the reserve power which takes the form of a spring housed in a barrel 6. The spring is wound by the synchronous motor 1 through the gear 7, a slipping connection existing between the spring and the barrel to prevent overwinding. When the spring is driving the time shaft, the rate at which it unwinds is controlled by an escapement device indicated generally by 8. The escapement device comprises a balance wheel 9 which operates a pallet 10 controlling the escape wheel 11. The escape wheel is also connected to the first element of the ball clutch 5 through a train of gearing 12. The balance wheel 9 is provided with a pin 13 fixed to its periphery. The means for locking the balance wheel in an extreme position comprises a soft iron member 14 arranged adjacent to the synchronous motor. The member 14 is pivoted about the fixed point 15 and is formed integral with a boss 16. The boss 16 also carries an arm 17 by means of two brackets 18, one end of the arm being bent as shown at 19. A blade spring 20 is fixed to the arm 17 at a point remote from both ends, and one end of the spring 20 is bent over at 22 while at the other end the spring is bent away from the arm and engages with a fixed post 21.

Figure 2:
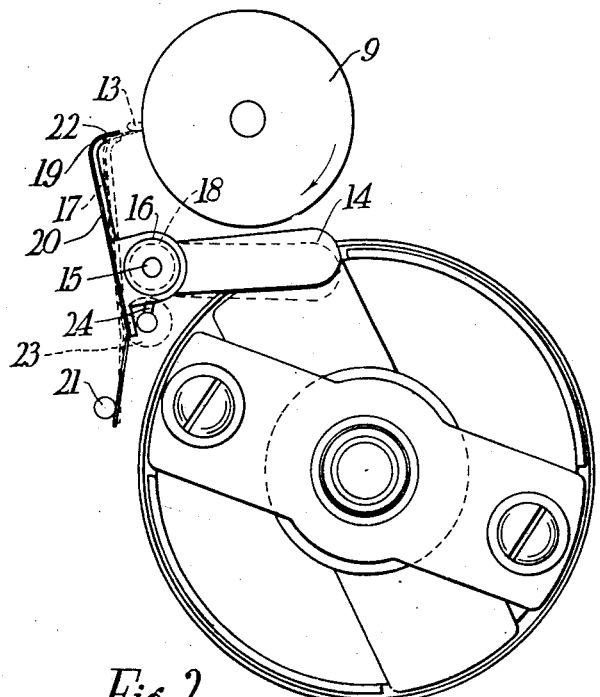
Fig. 2 shows an elevation of the locking means.

The operation of the clock is as follows. Assume that the spring is driving the clock, the synchronous motor having ceased to operate. When the synchronous motor again starts and drives the time shaft 4 through the gearing 2 and ball clutch 3, the magnetic member 14 is acted upon by the leakage flux from the motor and takes up the dotted position against the tension of the spring 20 acting on the post 21 as shown in Fig. 2. The movement of the member 14 from the full-line to the dotted position causes a similar movement on the part of the arm 17 from the full-line to the dotted position. The end 22 of the blade spring 20 is now in the path of the pin 13 fixed to the balance wheel. The direction of oscillation of the balance wheel from the position shown in Fig. 2 is indicated by the arrow and it will be appreciated that the pin 13 towards the end of an oscillation will strike the underside of the spring blade. Now the spring since it is fixed to the arm 17 at a point remote from its ends allows the pin 13 to pass when moving in an upward direction but does not let it pass when moving in a downward direction, so that the balance wheel is stopped in the position shown in Fig. 2 which is the position of maximum potential energy. The spring-drive to the clock is therefore interrupted.

When the synchronous motor stops for instance due to an interruption in the current supply the leakage field collapses and the member 14 returns to the full-line position under the action of the spring 20. The arm 17 also returns to the full-line position and the end 22 of the spring 20 is removed from under the pin 13 whereupon the balance wheel is released and the spring-drive operates the time shaft.

Figure 3:
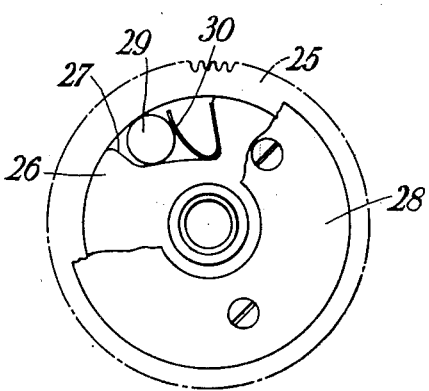
Fig. 3 shows a form of ball clutch which is particularly suitable for use in the movement.

Fig. 3 shows a suitable form of ball clutch for use at 3 and 5. The clutch is formed with an outer toothed ring 25 which forms one element of the clutch. Within this ring is a circular disc 26 fixed to the time shaft 4 and provided with a number of notches such as 27. A cover plate 28 having a larger diameter than the disc 26 is bolted to the disc. In each of the notches 27 is located a ball 29 against which presses a spring 30. If the ring 25 is rotated in an anti-clockwise direction the ball will jam against the ring and a solid drive to the time shaft will be effected. If, however, the time shaft is rotated in an anti-clockwise direction the ball will be pressed against the spring, the disc 26 will slip inside the ring and the latter will not be rotated.

Referring now to Fig. 1 if the synchronous motor is driving the clock, the ring of the clutch 3 is rotated in an anti-clockwise direction and carries the second element, the time shaft and the second element of the clutch 5 with it. The movement of the second element of the clutch 5 however will not be transmitted to the first element and hence the escapement device will not be subjected to any undue strain. The reverse occurs of course when the time shaft 4 is driven by the spring under the control of the escapement device and the motor is stationary.

Manually-operable means are also provided whereby the spring-driving means can be permanently prevented from driving the time shaft. Thus in Fig. 2 the member 23 is manually rotatable and carries a pin 24 which when the member 23 is rotated in an anti-clockwise direction takes up the position shown in dotted lines thereby causing the end 22 of the spring 20 to be moved into the path of the pin 13. The member 23 can be rotated from outside the casing of the clock by a rotatable knob or other suitable means.

Figure 4:
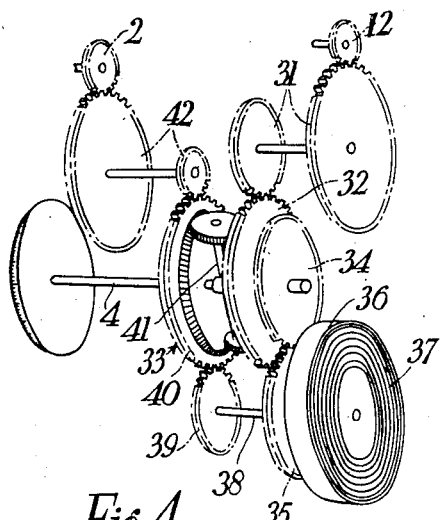
Fig. 4 shows an alternative drive between the synchronous electric motor and the time shaft.

Fig. 4 shows an alternative drive between the gear trains 2 and 12 and the time shaft 4. The escapement device is connected, through the gear train 12 and the gear wheels 31, to one of the sun wheels 32 of a differential device indicated generally by 33. Formed integral with the sun wheel 32 is a gear wheel 34 which meshes with a gear wheel 35 formed integrally with the spring barrel 36. One end of the spring 37 is in frictional engagement with the barrel 36 while the other end is attached to a shaft 38 which carries a gear wheel 39 meshing with the second sun wheel 40 of the differential. Both sun wheels are mounted loosely on the time shaft 4 while the planet carrier 41 is rigidly mounted thereon. The synchronous electric motor is connected to the gear train 2 and controls through gearing 42 the movement of the sun wheel 40.

The operation of this arrangement is as follows: When the synchronous motor is in operation the escapement device is locked as before and hence the sun wheel 32 is locked and the motor drives the time shaft 4 through the gearing 2, 42, the sun wheel 40 and the planet carrier 41. Further the spring is wound up through the gear 39. When the synchronous motor fails the sun wheel 32 and the escapement device are released and the sun wheel 40 is locked. The time shaft 4 is then driven by the spring 37, through gear wheels 35, 34 and sun wheel 32 to the planet carrier 41 under the control of the escapement. It is to be noted that in this construction no strain is applied to the planet wheel of the differential, since the winding of the spring is effected independently of the differential.

It will be appreciated that the invention is not limited to the constructions shown but various modifications will be obvious to those skilled in the art all of which fall within the scope of the invention as defined by the following claim.

I claim:—

In a clock disposed to be driven by an electric motor and on deenergization thereof by a spring motor, in combination, balance means including a balance wheel for controlling the functioning of said spring motor, a pin projecting radially from said balance wheel, an arm pivoted about an axis substantially parallel to the axis of rotation of said balance wheel and in substantially the same plane as said balance wheel, an armature extending from said arm and disposed to move the same under the influence of the magnetic field of said motor, and a blade spring member secured to one end of said arm and extending therealong and having its outer end curved and positioned in the path of said pin at a position substantially spaced from its mid-position on energization of said motor, said curved outer end portion of said blade spring being positioned along the side of said arm away from said balance wheel so as to permit said pin to pass the same when it is moving toward said position and away from said mid-position and to prevent movement thereof in the opposite direction, whereby said balance wheel is always stopped in a position of relatively high potential energy on energization of said motor.

FREDERICK ROY BUTHERUS.